(12) United States Patent
Yoshikuni et al.

(10) Patent No.: US 10,027,858 B2
(45) Date of Patent: Jul. 17, 2018

(54) CAMERA DEVICE

(71) Applicant: PANASONIC INTELLECTUAL PROPERTY MANAGEMENT CO., LTD., Osaka (JP)

(72) Inventors: Yuki Yoshikuni, Fukuoka (JP); Hiroyuki Tashiro, Fukuoka (JP); Masayoshi Kondou, Fukuoka (JP); Soichi Ikegami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/883,992

(22) Filed: Oct. 15, 2015

(65) Prior Publication Data
US 2016/0144798 A1 May 26, 2016

(30) Foreign Application Priority Data

Nov. 25, 2014 (JP) .................. 2014-237354
Feb. 25, 2015 (JP) .................. 2015-034919

(51) Int. Cl.
*H04N 7/18* (2006.01)
*H04N 5/225* (2006.01)
*B60R 11/04* (2006.01)
*B60R 11/00* (2006.01)

(52) U.S. Cl.
CPC .......... *H04N 5/2252* (2013.01); *B60R 11/04* (2013.01); *H04N 7/183* (2013.01); *B60R 2011/0094* (2013.01)

(58) Field of Classification Search
None
See application file for complete search history.

(56) References Cited

U.S. PATENT DOCUMENTS

| 6,268,882 B1 * | 7/2001 | Elberbaum ...... G08B 13/19619 348/143 |
| 8,764,318 B2 | 7/2014 | Wada et al. |
| 2007/0075918 A1 * | 4/2007 | Cuprys ................. F41G 3/165 345/8 |

FOREIGN PATENT DOCUMENTS

JP          08-113082        5/1996

* cited by examiner

*Primary Examiner* — Mark T Monk
(74) *Attorney, Agent, or Firm* — Greenblum Bernstein, P.L.C.

(57) ABSTRACT

Disclosed is a camera device including: a camera body; a transparent lens cover configured to cover a lens portion of the camera body; and a guard member configured to protect the lens cover from external impact, in which a projecting part is formed in the guard member, and when the camera device is mounted on a target object, the camera device is in a first state in which the lens cover is disposed between the projecting part of the guard member and the target object, or is in a second state in which the projecting part of the guard member is disposed between the lens cover and the target object.

20 Claims, 18 Drawing Sheets

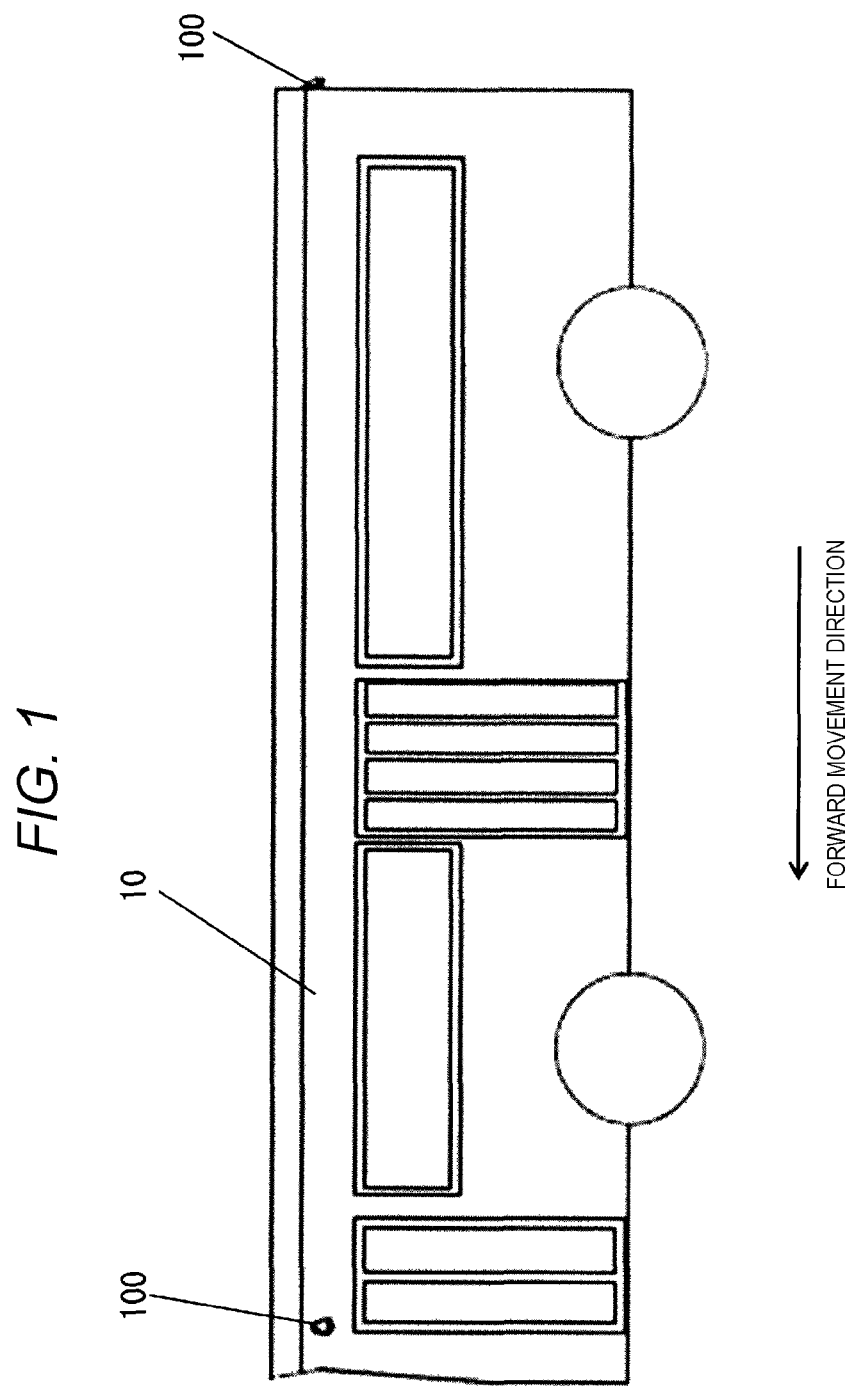

CAMERA DEVICE

BACKGROUND OF THE INVENTION

1. Field of the Invention

The present invention relates to a camera device that is installed on a vehicle such as a bus, and can view the vicinity of the vehicle within the visual field.

2. Description of the Related Art

In recent years, with a camera installed on a vehicle and a monitor provided in a driver's seat, a driver can view the vicinity of the vehicle within the visual field of the camera. Particularly in a vehicle such as a bus, passengers are boarding and de-boarding in the vicinity of the vehicle at a high frequency such that it is necessary to ensure a sufficient range of a visual field for the purpose of safety, and for example, according to Japanese Patent Unexamined Publication No. 8-113082, a camera is used while being mounted on the exterior of the vehicle.

When the camera is mounted on the exterior of the vehicle as such, the camera is required to be designed in harmony with the vehicle, and to have robustness against contact between the camera and roadside trees or the like. Particularly in a bus or the like, cameras affect passengers' impression of the bus or the like, and thus the cameras installed on a side part (the vicinity of a boarding entrance of the bus) and a rear part of the vehicle are required to have a uniform shape from the viewpoint of design.

However, when a guard portion has been provided to protect a lens cover from roadside trees or the like in preparation for a case of the camera being installed on the side part of the vehicle, if the camera is installed on the rear part of the vehicle, a rearward visual field is limited by the guard portion, which is a problem. For this reason, the camera is required to be well designed, and the rearward visual field of the camera is required not to be limited by the guard portion even if the camera is installed on the rear part of the vehicle.

SUMMARY OF THE INVENTION

The present invention is made to solve this problem in the related art, and a main object of the present invention is to provide a camera device that is installed on a vehicle such as a bus, and can view the vicinity of the vehicle within the visual field.

According to an aspect of the present invention, there is a camera device including: a camera body; a transparent lens cover configured to cover a lens part of the camera body; and a guard member configured to protect the lens cover from external impact, in which a projecting part is formed in the guard member, and when the camera device is mounted on a target object, the camera device is in a first state in which the lens cover is disposed between the projecting part of the guard member and the target object, or is in a second state in which the projecting part of the guard member is disposed between the lens cover and the target object.

In this configuration of the present invention, when the camera device is installed on a side part of the vehicle such as a bus, the projecting part of the guard member is disposed further outside of the lens cover relative to the vehicle such that the guard member protects the lens cover from impact against roadside trees or the like. In contrast, when the camera device is installed in a rear part of the vehicle, the projecting part of the guard member is disposed closer to the vehicle than the lens cover such that the rearward visual field is not limited by the guard member. That is, it is possible to provide the camera device which can view the vicinity of the vehicle within the visual field.

BRIEF DESCRIPTION OF DRAWINGS

FIG. 1 is a view illustrating a mounting state of a camera device in a first exemplary embodiment;

DETAILED DESCRIPTION OF PREFERRED EMBODIMENTS

Hereinafter, exemplary embodiments of the present invention will be described with reference to the accompanying drawings.

First Exemplary Embodiment

FIG. 1 is a view illustrating a mounting state of camera device 100 in a first exemplary embodiment. In the exemplary embodiment, an example of when camera device 100 is mounted on a side part and a rear part of bus 10 will be described.

In FIG. 1, camera device 100 is mounted in a region above the vicinity of a boarding entrance door on the left side part of bus 10, which is a blind spot in which the safety of passengers boarding and de-boarding bus 10 cannot be confirmed. When passengers board and de-board bus 10, camera device 100 is not required to ensure the visual field for a distant side region that does not lie in a movement direction of bus 10. In contrast, when bus 10 moves forwards, camera device 100 is required to be protected from impact against roadside trees or the like.

In FIG. 1, camera device 100 is mounted in an upper central region in the rear part of bus 10 so as to confirm a blind spot in the back of the vehicle when bus 10 moves rearwards. At this time, camera device 100 is required to ensure a sufficient range of a visual field for a distant rear region that lies in the backward movement direction of bus 10. In contrast, since camera device 100 is positioned on the back of the vehicle moving forwards, the necessity of protecting camera device 100 from impact against roadside trees or the like decreases.

Figure 2A:
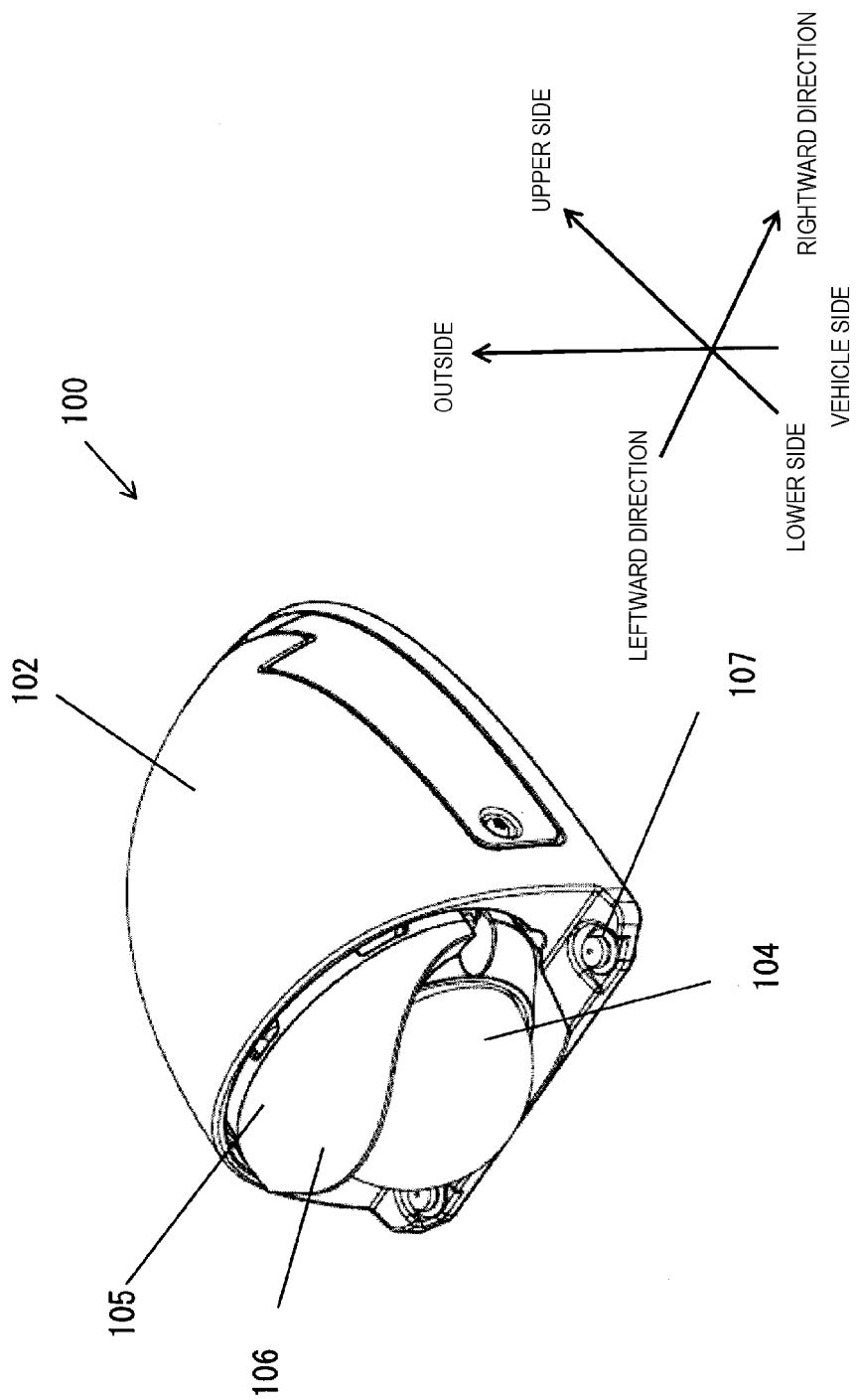
FIG. 2A is a perspective view of the camera device in the first exemplary embodiment.

FIG. 2A is a perspective view of camera device 100 in the first exemplary embodiment. In FIG. 2A, camera device 100 is assumably mounted on the side part of bus 10. Camera device 100 is protected from hard rain, sand dust, or the like by camera cover 102 that supports and covers camera body 101 (to be described later), and transparent lens cover 104 that covers lens portion 103 (to be described later) of camera body 101.

In addition, camera device 100 includes guard member 105 which is a feature of the exemplary embodiment. Guard member 105 is attached to camera cover 102 in such a way as to surround lens cover 104. Guard member 105 has projecting part 106 that is formed by projecting a portion of guard member 105 so as to protect lens cover 104 from impact against roadside trees or the like when bus 10 is traveling.

Camera device 100 is mounted on bus 10 with mounting screws 107. In the following description, as necessary, a positional relationship between components of camera device 100, or a positional relationship in the mounting of the components is described using the directions represented by three axial arrows in FIG. 2A.

In the definition of the directions represented by the three axial arrows, a "vehicle side" refers to a side on which camera device 100 is mounted on bus 10 with mounting screws 107, and an "outside" refers to a direction in which mounted camera device 100 is detached. A "lower side" refers to a side on which lens cover 104 is positioned, in other words, a subject is present, and an "upward side" refers to a side on which camera cover 102 covering camera body 101 is present. A "rightward direction" and a "leftward direction" refer to rightward and leftward directions when camera device 100 (which is mounted in such a way that an upward and downward direction of camera device 100 corresponds to an upward and downward direction of bus 10) is seen from the "outside" to the "vehicle side".

Projecting part 106 of guard member 105 projects in a direction in which a subject is present, that is, toward the "lower side".

In FIG. 2A, when camera device 100 is mounted on the side part of bus 10 in such a way that the "upward and downward direction" of camera device 100 corresponds to the upward and downward direction of bus 10, projecting part 106 of guard member 105, lens cover 104, and bus 10 are sequentially disposed from the "outside" to the "vehicle side". In other words, lens cover 104 is disposed between projecting part 106 of guard member 105 and bus 10.

In this configuration, when camera device 100 is mounted on the side part of bus 10, projecting part 106 of guard member 105 can protect lens cover 104 from impact against roadside trees or the like.

In FIG. 2A, a substantially longitudinal rectangular portion in camera cover 102 serves as a cover for removing a storage medium or the like, and since the substantially longitudinal rectangular portion does not affect the feature of the exemplary embodiment, a description thereof will be omitted in FIG. 2A and the subsequent drawings.

Figure 2B:
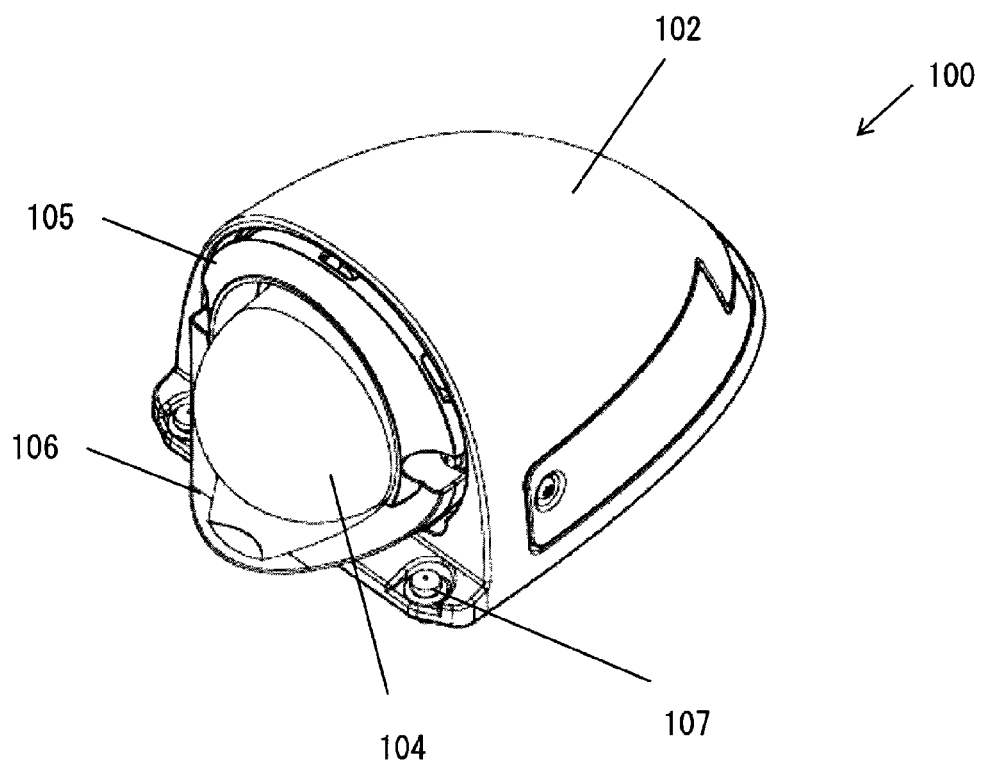
FIG. 2B is another perspective view of the camera device the first exemplary embodiment.

FIG. 2B is a perspective view of camera device 100 in the first exemplary embodiment. In FIG. 2B, camera device 100 is assumably mounted on the rear part of bus 10. The point of difference between camera device 100 in FIG. 2B and camera device 100 in FIG. 2A is a positional relationship between projecting part 106 of guard member 105 and bus 10. That is, projecting part 106 of guard member 105 is positioned on the "vehicle side" in FIG. 2B whereas projecting part 106 is positioned on the "outside" in FIG. 2A.

In FIG. 2B, when camera device 100 is mounted on the rear part of bus 10 in such a way that the "upward and downward direction" of camera device 100 corresponds to the upward and downward direction of bus 10, lens cover 104, projecting part 106 of guard member 105, and bus 10 are sequentially disposed from the "outside" to the "vehicle side". In other words, projecting part 106 of guard member 105 is disposed between lens cover 104 and bus 10.

In this configuration, when camera device 100 is mounted on the rear part of bus 10, projecting part 106 of guard member 105 does not block the visual field from lens cover 104, and thus it is possible to ensure a sufficient range of a visual field for a distant rear region.

Figure 3:
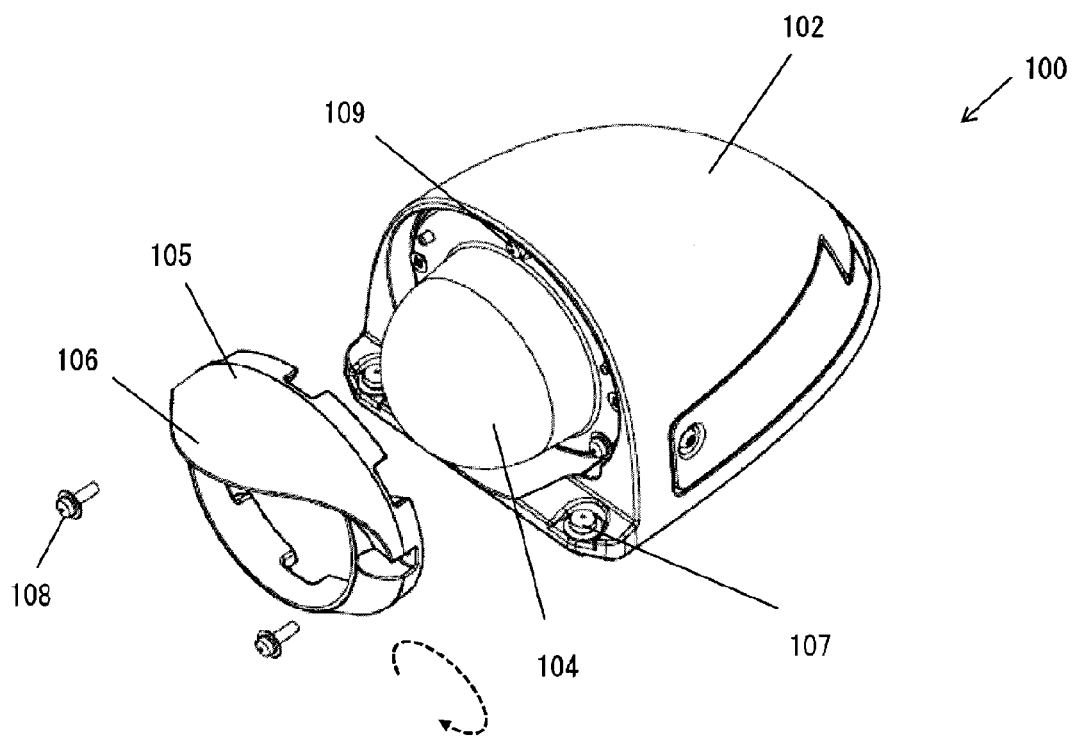
FIG. 3 is an exploded perspective view of the camera device in the first exemplary embodiment.

FIG. 3 is an exploded perspective view of camera device 100 in the first exemplary embodiment. As illustrated in FIG. 3, guard member 105 is formed in a substantially circular ring shape, and as described above, a portion of guard member 105 projects in the direction in which a subject is present, that is, toward the "lower side" such that the portion of guard member 105 forms projecting part 106.

Guard member 105 is fixed to camera cover 102 with fixing screws 108 in such a way so as to surround lens cover 104. In the configuration illustrated in FIG. 2A, guard member 105 is fixed as illustrated in FIG. 3.

It is possible to unfix guard member 105 fixed with fixing screws 108, to rotate guard member 105 by 180 degrees as illustrated by the dotted line, and then to fix guard member 105 with fixing screws 108. In the configuration illustrated in FIG. 2B, guard member 105 is fixed in this state.

In the description given with reference to FIG. 3, guard member 105 has a substantially circular ring shape, and guard member 105 is detached and rotated by 180 degrees; however, the time and labor required to detach guard member 105 may be eliminated by forming guard member 105 in an accurate circular ring shape. The reason for this is that the time and labor required to detach guard member 105 is not only eliminated but guard member 105 can also be prevented from being lost during storage of camera device 100.

For example, when the substantially circular ring shape of guard member 105 is an elliptical shape with the major axis in the rightward and leftward direction, a wide base portion of projecting part 106 of guard member 105 is obtained, and thus it is possible to avoid impact from roadside trees or the like.

When the substantially circular ring shape of guard member 105 is an elliptical shape with the minor axis in the rightward and leftward direction, the base portion of projecting part 106 of guard member 105 can be attached while being separate from lens cover 104, and thus it is possible to minimize vignetting caused by projecting part 106.

Guard member 105 with a substantially circular ring shape or an accurate circular ring shape has been described;

however, insofar as guard member 105 can be fixed with fixing screws 108, guard member 105 may be a member with a circular arc shape which forms a portion of the substantially circular ring shape, or may be a member with a circular arc shape which forms a portion of the accurate circular ring shape.

Figure 4A:
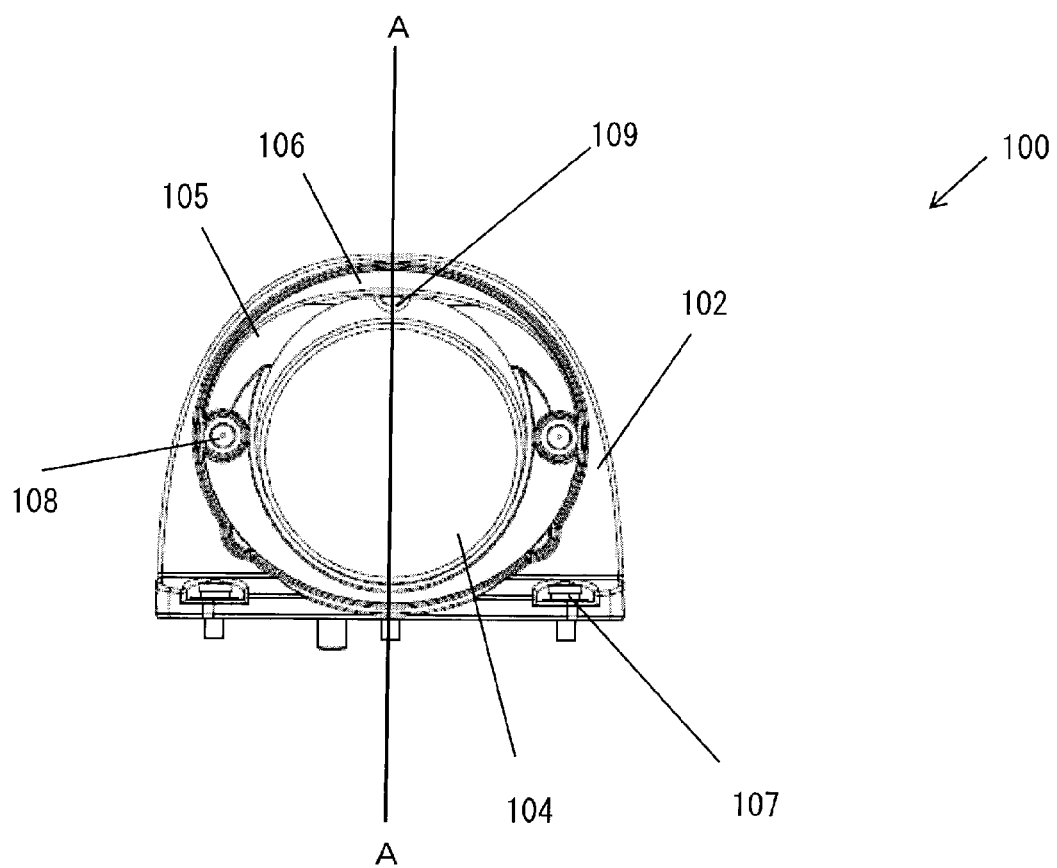
FIG. 4A is a view of the camera device when seen from the bottom in the first exemplary embodiment.

FIG. 4A is a view of camera device 100 in the first exemplary embodiment when seen from the "lower side". Camera device 100 is configured as illustrated in FIG. 2A. As illustrated in FIG. 4A, a substantially circular guard member 105 surrounding the circumference of the lens cover 104 is fixed to camera cover 102 with two fixing screws 108.

Fixing screw 109 between a hemispherical portion of lens cover 104 and guard member 105 is used to fix an edge portion of lens cover 104 to camera cover 102. As illustrated in FIG. 4A, the edge portion of lens cover 104 is fixed to camera cover 102, guard member 105 is fixed in such a way as to press the edge portion.

A section taken along line A-A in FIG. 4A will be described later, and is not described at this point in time.

Figure 4B:
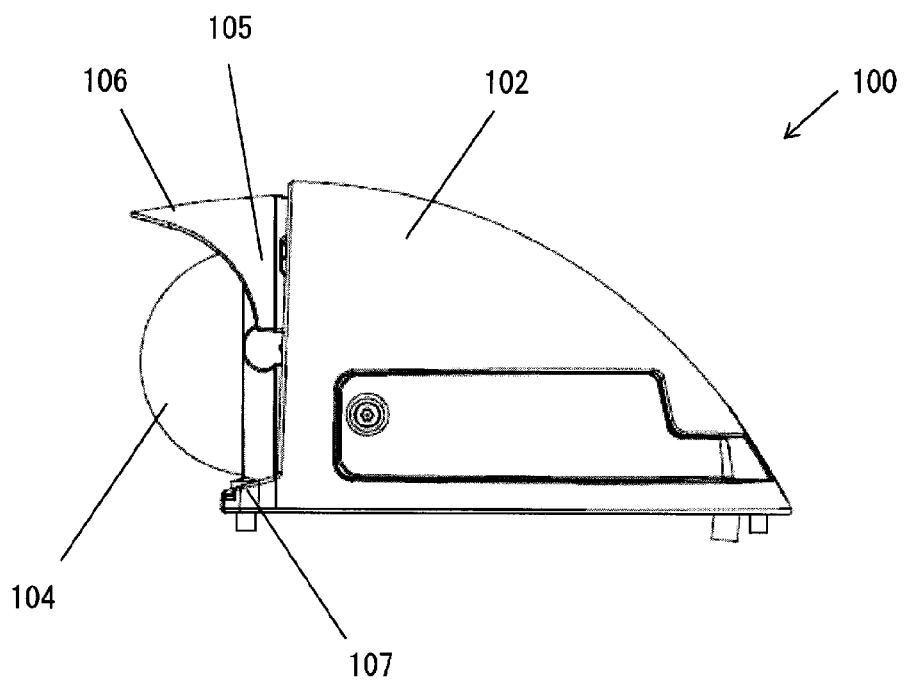
FIG. 4B is a view of the camera device when seen from the right in the first exemplary embodiment.

FIG. 4B is a view of camera device 100 in the first exemplary embodiment when seen from the right. Camera device 100 is configured as illustrated in FIG. 2A.

Camera cover 102 is formed in a streamline shape in which the "outside" of camera cover 102, that is, the upper side in FIG. 4B is widened on the "lower side", that is, in a direction in which lens cover 104 is present, and projecting part 106 of guard member 105 extends from streamline camera cover 102, and further projects toward the "lower side".

Figure 5:
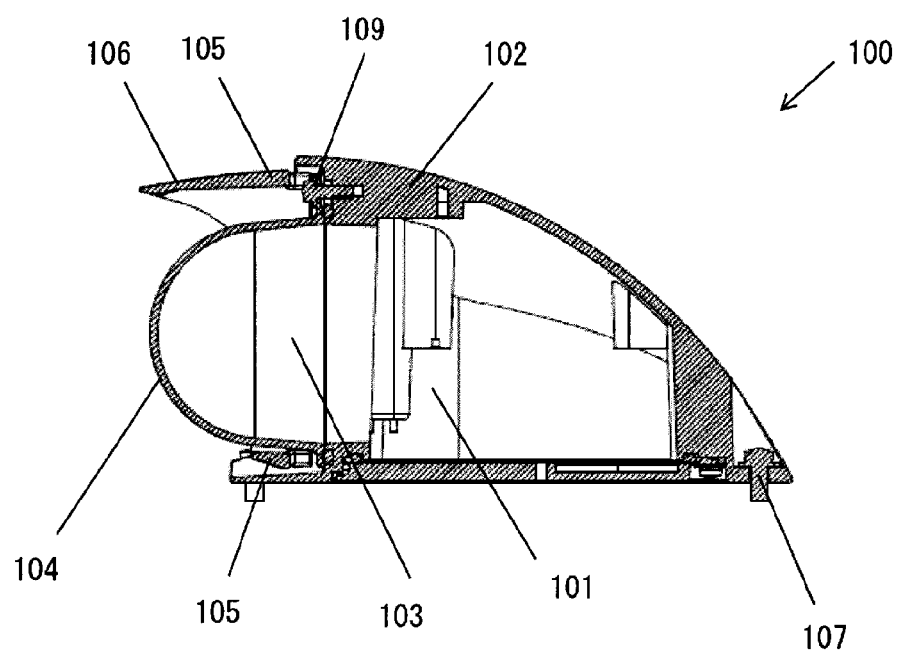
FIG. 5 is a sectional view of the camera device in the first exemplary embodiment taken along line V-V in FIG. 4A.

FIG. 5 is a sectional view of camera device 100 in the first exemplary embodiment taken along line A-A. FIG. 5 illustrates a section taken along line A-A in FIG. 4A. As illustrated in FIG. 5, camera body 101 configured to image a subject is supported by and covered with camera cover 102. Lens portion 103 of camera body 101 is covered with lens cover 104.

Since the edge portion of lens cover 104 is fixed to camera cover 102 while being in close contact therewith, camera body 101 including lens portion 103 is protected from hard rain, sand dust, or the like.

Cover member 105 is attached in such a way as to surround lens cover 104. Since guard member 105 is formed in an elliptical shape with the minor axis in the "rightward and leftward direction", the base portion of projecting part 106 of guard member 105 is further separated from lens cover 104 than other portions (portions of guard member 105 in which projecting part 106 is not provided).

In this configuration, as illustrated in FIG. 3, it is possible to minimize vignetting caused by projecting part 106 of guard member 105.

Figure 6A:
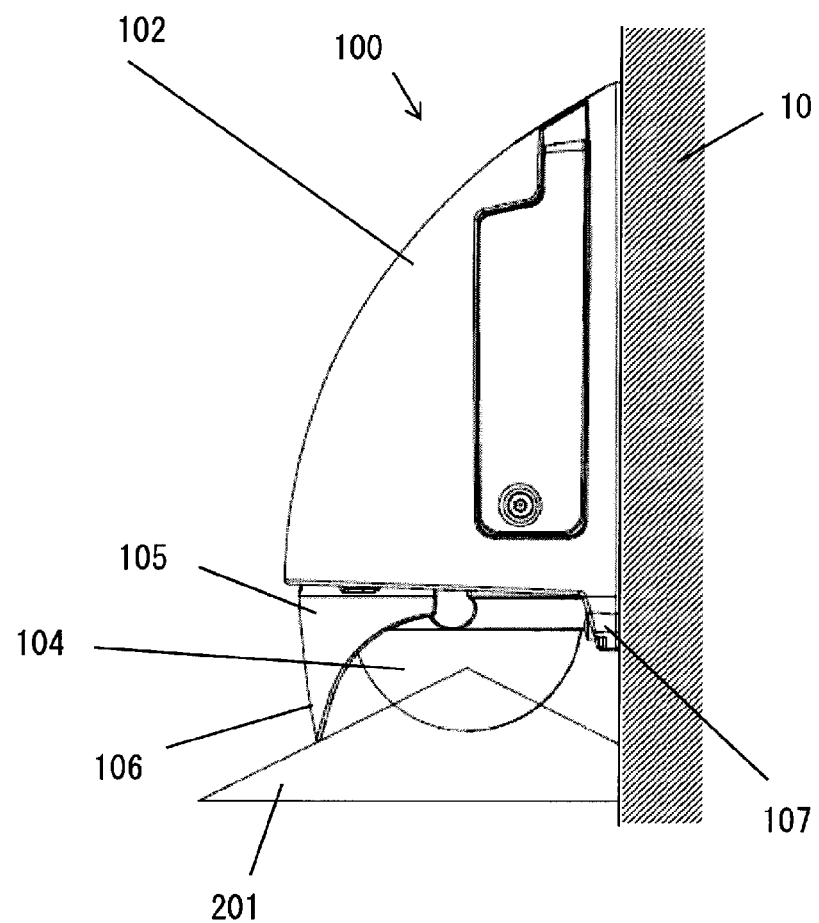
FIG. 6A is a view illustrating the visual field of the camera device in the first exemplary embodiment.

FIG. 6A is a view illustrating the visual field of camera device 100 in the first exemplary embodiment. FIG. 6A illustrates a case in which camera device 100 illustrated in FIG. 2A is mounted on the side part of bus 10 in such a way that the "upward and downward direction" of camera device 100 corresponds to the upward and downward direction of bus 10.

Reference sign 201 represents the viewing angle of camera device 100, which is mounted in this way, for the vicinity of the vehicle. As understood from FIG. 6A, the viewing angle is limited by projecting part 106 of guard member 105 fixed on the "outside".

Figure 6B:
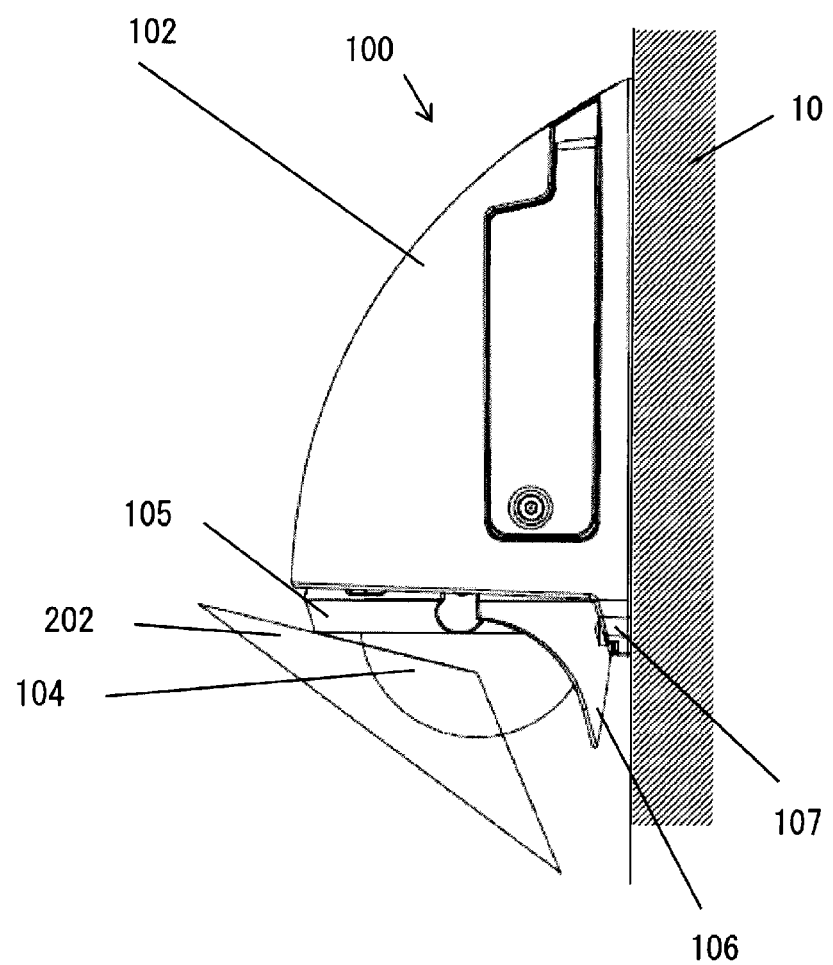
FIG. 6B is a view illustrating the visual field of the camera device in the first exemplary embodiment.

FIG. 6B is a view illustrating the visual field of camera device 100 in the first exemplary embodiment. FIG. 6B illustrates a case in which camera device 100 illustrated in FIG. 2B is mounted on the rear part of bus 10 in such a way that the "upward and downward direction" of camera device 100 corresponds to the upward and downward direction of bus 10.

Reference sign 202 represents the viewing angle of camera device 100, which is mounted in this way, for the vicinity of the vehicle. As understood from FIG. 6B, the viewing angle is not limited by projecting part 106 of guard member 105 fixed on the "vehicle side".

As described above, when camera device 100 is installed on the side part of bus 10, projecting part 106 of guard member 105 is disposed further outside of lens cover 104 relative to the vehicle such that guard member 105 can protect lens cover 104 from impact against roadside trees or the like.

When camera device 100 is installed on the rear part of bus 10, projecting part 106 of guard member 105 is disposed closer to the vehicle than lens cover 104 such that the rearward visual field is not limited by guard member 105. That is, camera device 100 can view the vicinity of the vehicle within the visual field.

Second Exemplary Embodiment

In the second exemplary embodiment, an example of the shape of guard member 105 of camera device 100 described in the first exemplary embodiment, particularly, the shape of projecting part 106 will be described. Duplicate portions of the description given in the first exemplary embodiment will be briefly described or omitted.

Figure 7:
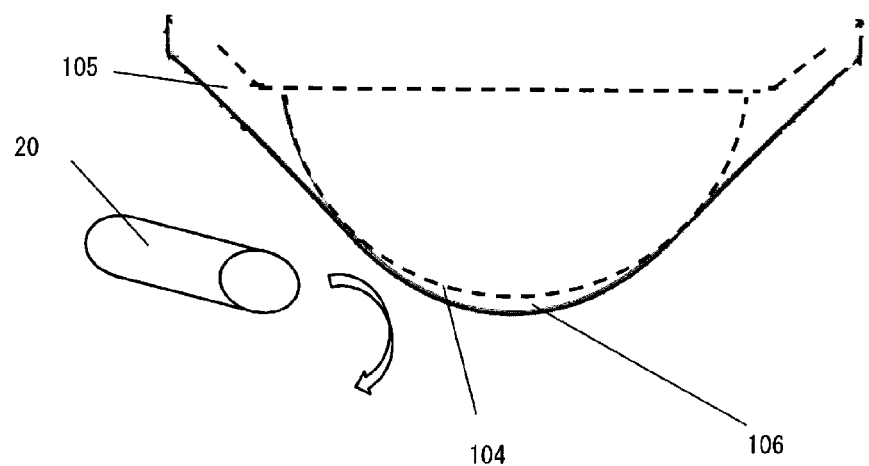
FIG. 7 is a view illustrating an example of the shape of a guard member in a second exemplary embodiment.

FIG. 7 is a view illustrating an example of the shape of guard member 105 in the second exemplary embodiment. FIG. 7 illustrates a state in which camera device 100 is mounted on the side part of bus 10 in such a way that the "upward and downward direction" of camera device 100 corresponds to the upward and downward direction of bus 10, and the vicinity of lens cover 104 is seen from the "outside" to the "vehicle side".

Since lens cover 104 is actually hidden by projecting part 106 of guard member 105, lens cover 104 is illustrated by the dotted line. Projecting part 106 of guard member 105 is formed in the shape of a gentle sloped mountain in which projecting part 106 is widened from a distal end portion to a base portion thereof such that lens cover 104 is protected.

The width of the base portion of projecting part 106 of guard member 105 is set to be greater than that of lens cover 104. The height of the distal end portion of projecting part 106 of guard member 105 is greater than that of lens cover 104.

When camera device 100 moves in response to the forward movement of bus 10, and obstacle 20 such as a roadside tree is present, due to the slope of the mountain shape, it is possible to avoid obstacle 20 such as a roadside tree as illustrated by the curved arrow while lens cover 104 is prevented from being scratched by the mountain shape.

Projecting part 106 of guard member 105 has a bilateral symmetrical shape when seen from the "outside" to the "vehicle side". For this reason, even if camera device 100 is mounted on the right side part of bus 10, it is possible to obtain the same effect.

As described above, projecting part 106 of guard member 105 is formed in the shape of a gentle sloped mountain in which projecting part 106 is widened toward the direction of the base portion, and thus it is possible to protect lens cover 104 from impact against roadside trees or the like by guard member 105.

Third Exemplary Embodiment

In the third exemplary embodiment, another example of the state of camera device 100 in the first exemplary embodiment being mounted on bus 10 will be described with reference to FIGS. 8 to 10. Duplicate portions of the description given in the first exemplary embodiment will be briefly described or omitted.

Figure 8:
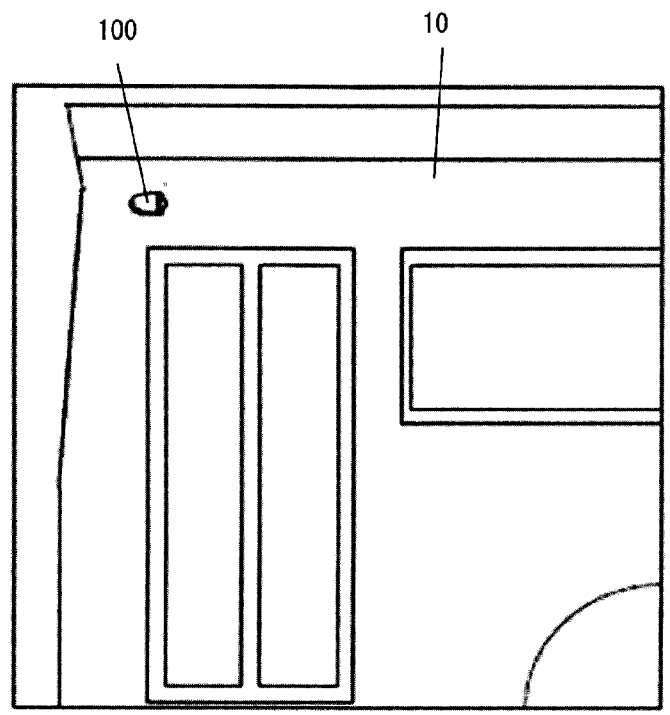
FIG. 8 is a view illustrating another example of a mounting state of the camera device in a third exemplary embodiment.

FIG. 8 is another example of a mounting state of camera device 100 in the third exemplary embodiment. FIG. 8 illustrates a state in which camera device 100 is mounted on the rear part of bus 10 in such a way that the "upward and downward direction" of camera device 100 corresponds to a forward and rearward direction of bus 10.

Figure 9:
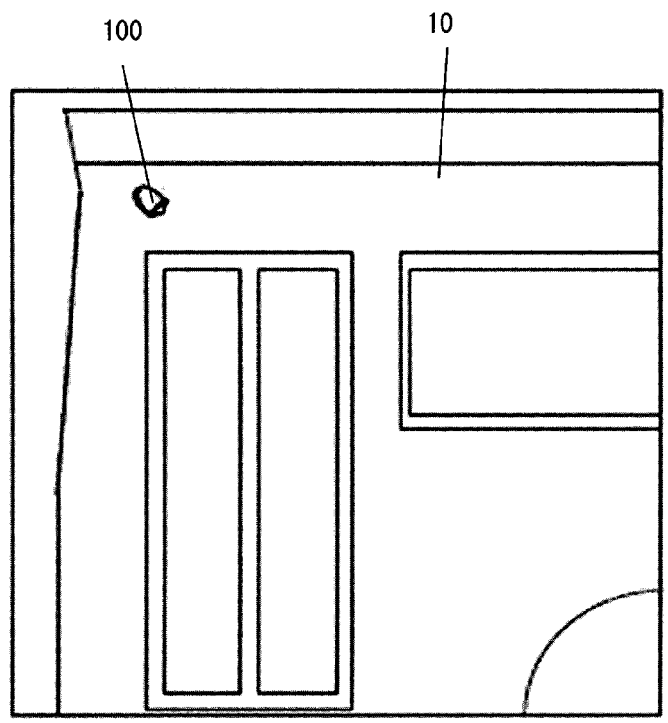
FIG. 9 is a view illustrating still another example of a mounting state of the camera device in the third exemplary embodiment.

FIG. 9 is still another example of a mounting state of camera device 100 in the third exemplary embodiment. FIG. 9 illustrates a state in which camera device 100 is mounted on the rear part of bus 10 in such a way that the "upward and downward direction" of camera device 100 corresponds to a direction from the forward upper side to the rearward lower side of bus 10.

In either of the mounting states in FIGS. 8 and 9, the "upper side" of camera device 100 is positioned on a front side of bus 10, and the "lower side" of camera device 100 is positioned on a rear side of bus 10. For this reason, as illustrated in FIG. 4B, mounted camera device 100 is formed in a streamline shape such that camera cover 102 along with projecting part 106 of guard member 105 is widened from the front side to the rear side of bus 10.

Figure 10:
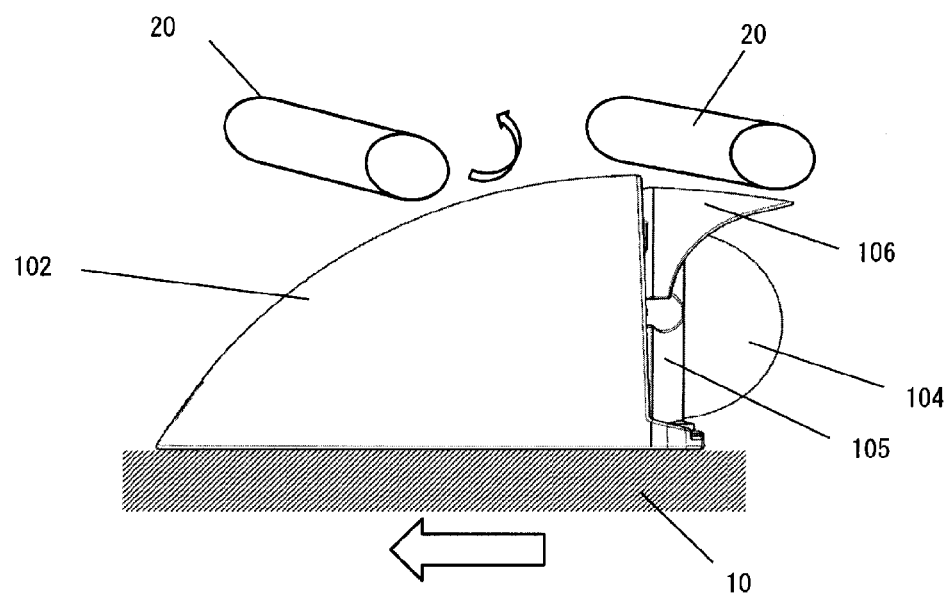
FIG. 10 is a view illustrating an example of the shape of the guard member in the third exemplary embodiment.

FIG. 10 is a view illustrating an example of the shape of guard member 105 in the third exemplary embodiment. When mounted camera device 100 with the above described streamline shape moves in a direction of the thick arrow in response to the forward movement of bus 10, and obstacle 20 such as a roadside tree is present, the slope of streamline camera cover 102 can allow obstacle 20 such as a roadside tree to graze camera cover 102 as shown by curved arrow.

Projecting part 106 of guard member 105 extends from streamline camera cover 102, and projects further toward the "lower side" than lens cover 104. For this reason, even if grazing obstacle 20 such as a roadside tree rebounds and returns its original position, lens cover 104 can be protected by projecting part 106 of guard member 105.

As described above, projecting part 106 of guard member 105 extends from streamline camera cover 102, and projects further toward the "lower side" than lens cover 104, and thus guard member 105 can protect lens cover 104 from impact against roadside trees or the like.

Fourth Exemplary Embodiment

In the fourth exemplary embodiment, an example in which the shape of guard member 105 (particularly, projecting part 106) of camera device 100 described in the first exemplary embodiment is different will be described. Duplicate portions of the description given in the first exemplary embodiment will be briefly described or omitted.

Figure 11:
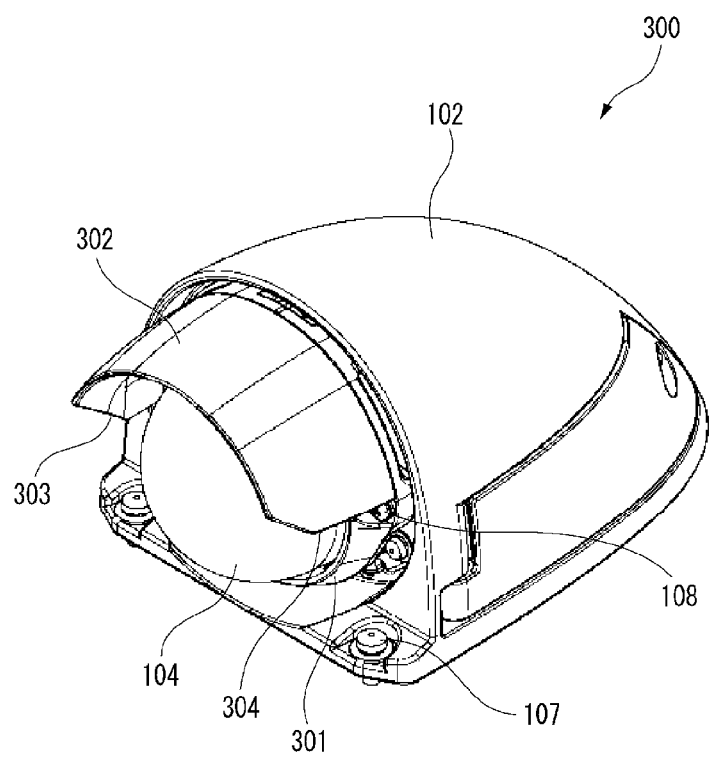
FIG. 11 is a perspective view of a camera device in a fourth exemplary embodiment.

FIG. 11 is a perspective view of camera device 300 in the fourth exemplary embodiment. In the embodiment, an example of when camera device 300 is mounted on the side part and the rear part of bus 10 will be described. In FIG. 11, camera device 300 is mounted on the side part of bus 10 in such a way that the "upward and downward direction" of camera device 300 corresponds to the upward and downward direction of bus 10.

Guard member 301 of camera device 300 has projecting part 302 for protecting lens cover 104. Projecting part 302 of guard member 301 is formed in a substantially half-cylindrical shape that covers a portion of the circumference of the lens cover so as to protect lens cover 104. A distal end portion and a base portion of projecting part 302 have substantially the same width. Accordingly, projecting part 302 covers a wide range of the circumference of the lens cover compared to when the projecting part 302 is formed in the shape of a gentle sloped mountain, the width of which is widened from the distal end portion to the base portion.

A half cylinder refers to a half portion of a cylinder when the cylinder is divided by a plane including the axis. The sectional shape of the half cylinder sectioned by a plane that is perpendicular to the axis is a semicircular arc. The "substantially half-cylinder shape" of projecting part 302 may be a circular arc which is larger than (that is, a major arc) or smaller than (that is, a minor arc) a half of the full circumference. In the "substantially half cylindrical shape", the radius of one circular arc of the half cylinder in an axial direction may be different from that of the other circular arc in the axial direction. The examples of the "substantially half cylinder" include a half elliptical cylinder, and a half cylinder that is obtained by cutting off both ends of a spheroid (which is obtained by rotating an ellipse around the major axis) in a direction along the major axis by a pair of planes that is perpendicular to the major axis in addition to a half true cylinder.

Both circumferential ends of projecting part 302 are disposed in a state where both circumferential ends extend to the vicinities of both diametral ends of lens cover 104. When projecting part 302 is attached as illustrated in FIG. 11, a left end 303 of the circumferential direction and a right end 304 of the circumferential direction are disposed remotely from lens cover 104. That is, projecting part 302 can protect lens cover 104 in a state where lens cover 104 is remotely covered with projecting part 302. Accordingly, guard member 301 can prevent roadside trees or the like from coming into contact with lens cover 104.

Figure 12:
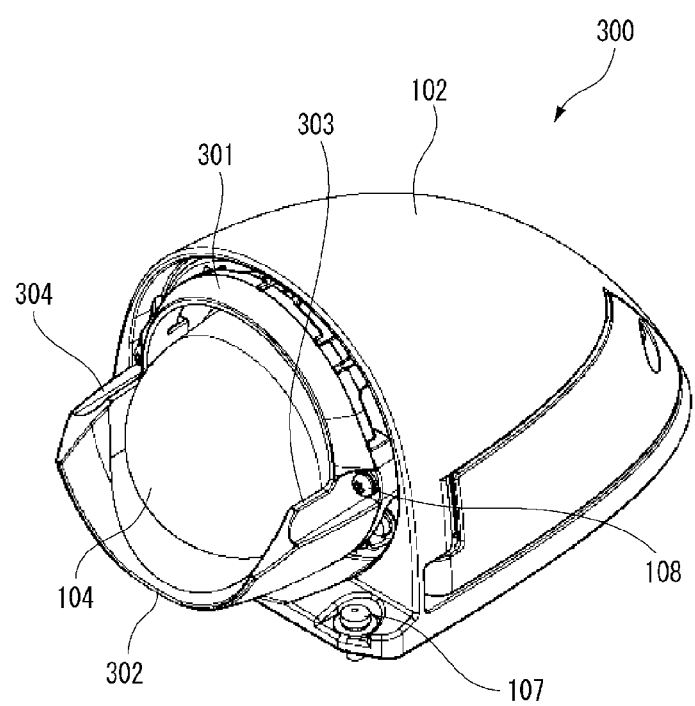
FIG. 12 is a perspective view of the camera device in the fourth exemplary embodiment.

FIG. 12 is a perspective view of camera device 300 in the fourth exemplary embodiment. In FIG. 12, camera device 300 is assumably mounted on the rear part of bus 10. The point of difference between camera device 300 in FIG. 12 and camera device 300 in FIG. 11 is a positional relationship between projecting part 302 of guard member 301 and bus 10. That is, projecting part 302 of guard member 301 positioned on the "outside" in FIG. 11 is positioned on the "vehicle side" in FIG. 12.

In FIG. 12, when camera device 300 is mounted on the rear part of bus 10 in such a way that an "upward and downward direction" of camera device 300 corresponds to the upward and downward direction of bus 10, lens cover 104, projecting part 302 of guard member 301, and bus 10 are sequentially disposed from the "outside" to the "vehicle side". In other words, projecting part 302 of guard member 301 is disposed between lens cover 104 and bus 10.

In this configuration, when camera device 300 is mounted on the rear part of bus 10, projecting part 302 of guard member 301 does not block the visual field from lens cover 104, and thus it is possible to ensure a sufficient range of a visual field for a distant rear region.

Figure 13:
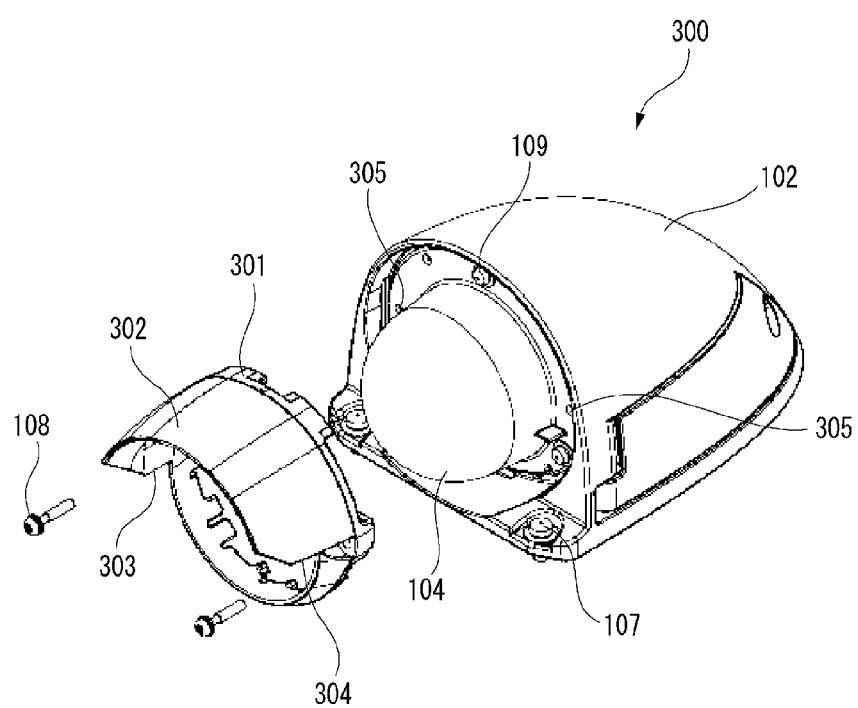
FIG. 13 is an exploded perspective view of the camera device in the fourth exemplary embodiment.

FIG. 13 is an exploded perspective view of camera device 300 in the fourth exemplary embodiment. Guard member 301 has a ring-shaped body part which is formed in a substantially circular ring shape. The ring-shaped body part of guard member 301 is fixed to camera cover 102 with fixing screws 108 in such a way as to surround lens cover 104. Fixing screws 108 are fixed into a pair of first screw holes 305 which are provided on the circumference of camera cover 102. Guard member 301 fixed as illustrated in FIG. 13 has the configuration illustrated with reference to FIG. 11.

It is possible to unfix guard member 301 fixed with fixing screws 108, to rotate guard member 301 by 180 degrees, and then to fix guard member 301 with fixing screws 108. Guard member 301 fixed in this state has the configuration illustrated with reference to FIG. 12.

As described above, in the embodiment, when camera device 300 is installed on the side part of bus 10, projecting part 302 of guard member 301 is formed in a substantially half cylindrical shape which covers a portion of the circumference of lens cover 104. For this reason, projecting part 302 of guard member 301 covers almost all of the outside of lens cover 104 which is opposite to the vehicle. As a result, it is possible to better protect lens cover 104 from impact against roadside trees or the like.

When camera device 300 is installed on the rear part of bus 10, projecting part 302 of guard member 301 is disposed closer to the vehicle than lens cover 104 such that the rearward visual field is not limited by guard member 301. That is, camera device 300 can view the vicinity of the vehicle within the visual field.

Fifth Exemplary Embodiment

In the fifth exemplary embodiment, another example of the state of camera device 300 in the fourth exemplary embodiment being mounted on bus 10 will be described with reference to FIGS. 14 to 17. Duplicate portions of the description given in the first exemplary embodiment will be briefly described or omitted.

Figure 14:
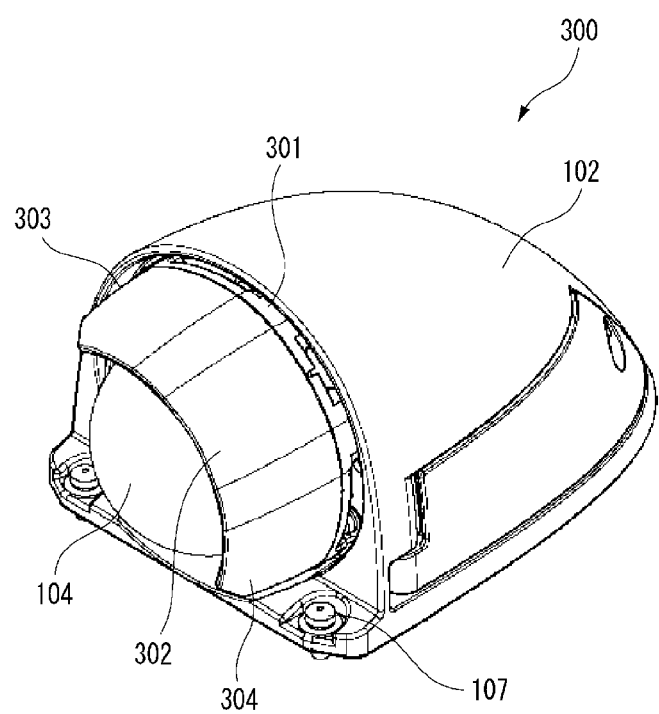
FIG. 14 is a perspective view of the camera device in a fifth exemplary embodiment.

FIG. 14 is a perspective view of camera device 300 in the fifth exemplary embodiment. FIG. 14 illustrates a state in which camera device 300 is mounted on the left side part of the vehicle in the forward movement direction of bus 10 in such a way that the "upward and downward direction" of camera device 300 corresponds to the forward and rearward direction of bus 10.

Figure 15:
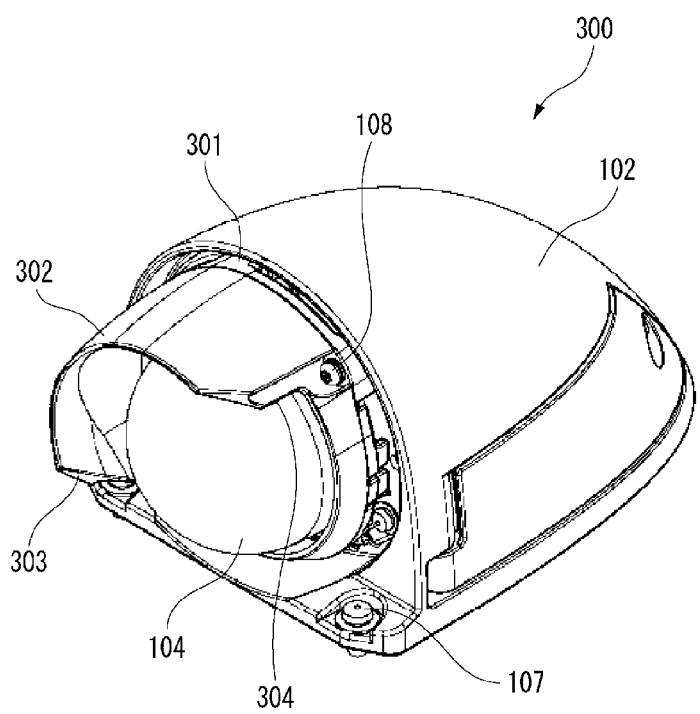
FIG. 15 is a perspective view of the camera device in the fifth exemplary embodiment.

FIG. 15 is a perspective view of camera device 300 in the fifth exemplary embodiment. FIG. 15 illustrates a state in which camera device 300 is mounted on the right side part of the vehicle in the forward movement direction of bus 10 in such a way that the "upward and downward direction" of camera device 300 corresponds to the forward and rearward direction of bus 10.

Figure 16:
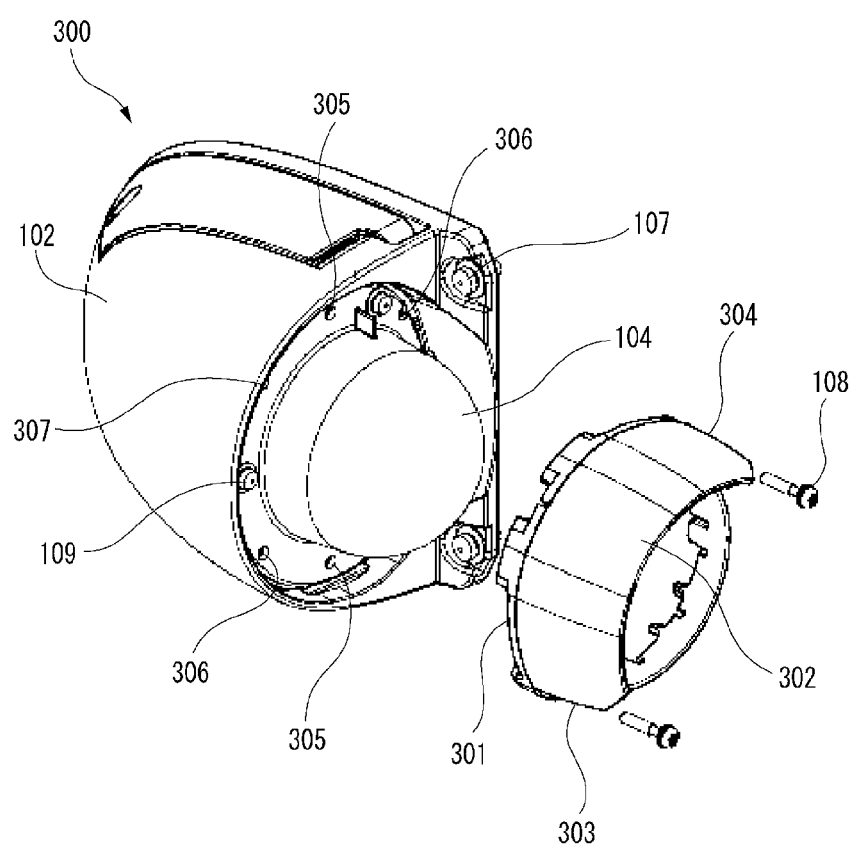
FIG. 16 is an exploded perspective view of the camera device in the fifth exemplary embodiment.

FIG. 16 is an exploded perspective view of camera device 300 in the fifth exemplary embodiment. When camera device 300 is mounted on the left side part of the vehicle in the forward movement direction of bus 10, fixing screws 108 are fixed into a pair of second screw holes 306 which are provided on the circumference of camera cover 102. In this case, when lens cover 104 is seen from the rear part of the vehicle to the front of bus 10, guard member 301 of camera device 300 is disposed while being rotated in a clockwise direction compared to when guard member 301 is fixed via first screw holes 305. The right end 304 of the circumferential direction is positioned at approximately one o'clock, and the left end 303 of the circumferential direction is positioned at approximately seven o'clock. Accordingly, the right end 304 of the circumferential direction in projecting part 302 of guard member 301 is attached in contiguity with the left side part of the vehicle in the forward movement direction of bus 10.

Figure 17:
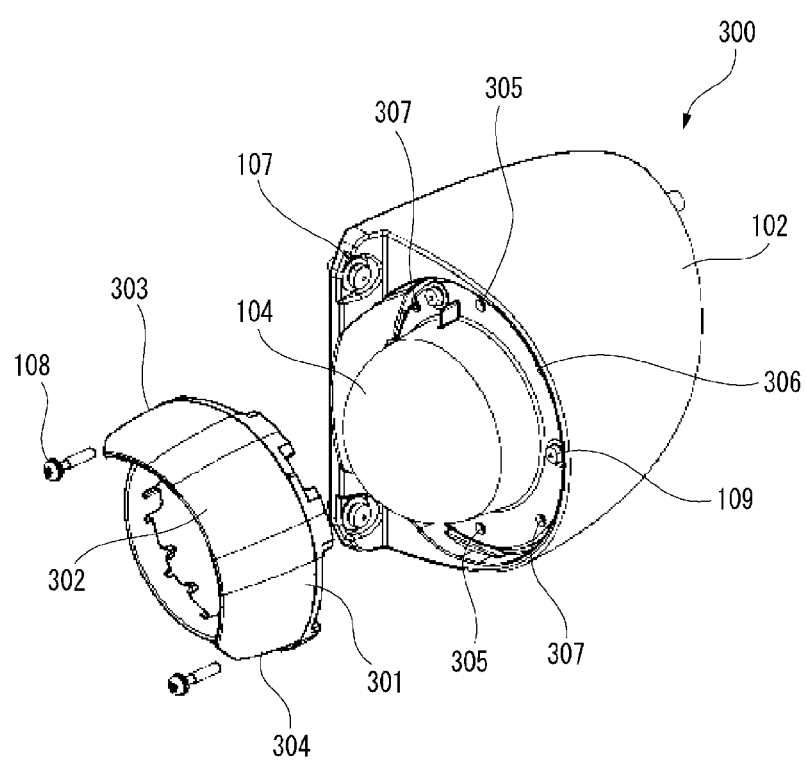
FIG. 17 is an exploded perspective view of the camera device in the fifth exemplary embodiment.

FIG. 17 is an exploded perspective view of camera device 300 in the fifth exemplary embodiment. When camera device 300 is mounted on the right side part of the vehicle in the forward movement direction of bus 10, fixing screws 108 are fixed into a pair of third screw holes 307 which are provided on the circumference of camera cover 102. In this case, when lens cover 104 is seen from the rear part of the vehicle to the front of bus 10, guard member 301 of camera device 300 is disposed while being rotated in a counterclockwise direction compared to when guard member 301 is fixed via first screw holes 305. The right end 304 of the circumferential direction is positioned at approximately five o'clock, and the left end 303 of the circumferential direction is positioned at approximately eleven o'clock. Accordingly, the left end 303 of the circumferential direction in projecting part 302 of guard member 301 is attached in contiguity with the right side part of the vehicle in the forward movement direction of bus 10.

In this configuration, guard member 301 can be referred to as a "rotating visor"

As such, in the embodiment, when camera device 300 is mounted on the side part of the vehicle in the forward movement direction of bus 10 in such a way that the "upward and downward direction" of camera device 300 corresponds to the forward and rearward direction of bus 10, one end or the other end of the circumferential direction in projecting part 302 is disposed in contiguity with bus 10. That is, when camera device 300 is installed on the left side part of the vehicle in the forward movement direction of bus 10, the right end 304 of the circumferential direction in projecting part 302 is disposed in contiguity with the left side part of the vehicle. In contrast, when camera device 300 is installed on the right side part of the vehicle in the forward movement direction of bus 10, the left end 303 of the circumferential direction in projecting part 302 is disposed in contiguity with the right side part of the vehicle. Accordingly, it is possible to eliminate the gap between bus 10 and guard member 301, and thus it is possible to prevent the incidence of light onto lens cover 104.

What is claimed is:

1. A camera device for capturing an image, the camera device comprising:
   a camera body configured to image a subject;
   a transparent lens cover configured to cover a lens portion of the camera body, the lens portion providing a viewing angle in a direction towards the subject to be imaged; and
   a guard member configured to protect the lens cover from external impact,
   wherein a projecting part is formed in the guard member and is projected in a direction of protrusion of the lens cover,
   wherein when the camera device is mounted on a target object, the camera device is in a first state in which the lens cover is disposed between the projecting part of the guard member and the target object, or is in a second state in which the projecting part of the guard member is disposed between the lens cover and the target object, and
   wherein, when the camera device is in the first state, a range of the viewing angle of the lens portion is smaller than when the camera device is in the second state.

2. The camera device of claim 1,
   wherein the projecting part of the guard member is formed having a width which is widened toward a base portion of the projecting part.

3. The camera device of claim 1,
   wherein when the guard member is rotated around the lens cover by 180 degrees, the camera device transitions from the first state to the second state.

4. The camera device of claim 1,
wherein the guard member is formed in a substantially circular shape which surrounds the lens cover.

5. The camera device of claim 1,
wherein the projecting part of the guard member is formed in a substantially half-cylindrical shape that covers a portion of the circumference of the lens cover.

6. The camera device of claim 5,
wherein the camera device is in a third state in which one end of a circumferential direction in the projecting part of the guard member is disposed in contiguity with the target object, or is in a fourth state in which the other end of the circumferential direction in the projecting part of the guard member is disposed in contiguity with the target object.

7. The camera device of claim 4,
wherein the circular shape comprises an elliptical shape.

8. The camera device of claim 7,
wherein the target object comprises a surface on which the camera device is mounted, and
wherein a major axis of the elliptical shape is substantially parallel to the surface.

9. The camera device of claim 7,
wherein the target object comprises a surface on which the camera device is mounted, and
wherein a major axis of the elliptical shape is substantially perpendicular to the surface.

10. The camera device of claim 1,
wherein the projecting part of the guard member is not overlapped with the lens cover as viewed from an optical axis of the lens portion.

11. The camera device of claim 1,
wherein the projecting part of the guard member is spaced from the lens cover as viewed from an optical axis of the lens portion.

12. The camera device of claim 1,
wherein the target object comprises a surface on which the camera device is mounted,
wherein the projecting part of the guard member obscures the lens cover when viewed from a perpendicular direction to the surface.

13. The camera device of claim 1,
wherein a tangent line of a front-most point of the lens cover when viewed in a cross section intersects with the projecting part of the guard member.

14. The camera device of claim 1,
wherein the target object comprises a surface on which the camera device is mounted and to which a fixed optical axis of the lens portion is substantially parallel.

15. The camera device of claim 1,
wherein a state of the camera device, corresponding to the first state or the second state, is determined based on a place of the target object where the camera device is mounted.

16. The camera device of claim 1,
wherein the camera body includes a projecting part extended along a surface of the target object on which the camera device is mounted,
wherein in the second state, the projecting part of the guard member is disposed between the projecting part of the camera body and lens cover.

17. A camera device for capturing an image, the camera device comprising:
a camera body configured to image a subject;
a lens that is disposed in the camera body, and configured to provide a viewing angle in a direction towards the subject to be imaged;
a lens cover of which at least part is projected from the camera body and that covers the lens; and
a guard member that is attached to the camera body and includes a projecting part that projects in a direction of protrusion of the lens cover, the guard member being movable around the lens cover, and extended away from the camera body, wherein
in a first state where the camera device is configured to be mounted on a first place, the projecting part of the guard member is disposed farther from the first place than from the lens cover,
in a second state where the camera device is configured to be mounted on a second place distinct from the first place, the projecting part of the guard member is disposed closer to the second place than to the lens cover, and
when the camera device is in the first state, a range of the viewing angle of the lens is smaller than when the camera device is in the second state.

18. The camera device of claim 17,
wherein the first place comprises a first part of a target object on which the camera device is mounted, and the second place comprises a second part of the target object.

19. The camera device of claim 17,
wherein the first place comprises a part of a first surface, and the second place comprises a part of a second surface.

20. A camera device for capturing an image, the camera device comprising:
a camera body that includes a first projecting part extended along a surface on which the camera device is mounted, the camera body being configured to image a subject;
a lens that is disposed in the camera body, and configured to provide a viewing angle in a direction towards the subject to be imaged;
a lens cover of which at least part is projected from the camera body and that covers the lens; and
a guard member that is attached to the camera body and includes a second projecting part that projects in a direction of protrusion of the lens cover, the guard member being movable around the lens cover, and extended away from the camera body, wherein
in a first state of the camera device, the lens cover is disposed between the first projecting part of the camera body and the second projecting part of the guard member,
in a second state of the camera device, the second projecting part of the guard member is disposed between the lens cover and the first projecting part of the camera body, and
when the camera device is in the first state, a range of the viewing angle of the lens is smaller than when the camera device is in the second state.

* * * * *